United States Patent [19]
Ancin et al.

[11] Patent Number: 6,038,340
[45] Date of Patent: *Mar. 14, 2000

[54] SYSTEM AND METHOD FOR DETECTING THE BLACK AND WHITE POINTS OF A COLOR IMAGE

[75] Inventors: Hakan Ancin, Cupertino; Anoop K. Bhattacharjya, Sunnyvale; Joseph S. Shu, San Jose, all of Calif.

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/747,069

[22] Filed: Nov. 8, 1996

[51] Int. Cl.$^7$ ........................................ G06K 9/00
[52] U.S. Cl. ........................ 382/167; 358/518; 382/225
[58] Field of Search ..................... 382/225, 165, 382/194, 162, 167, 192, 224, 274, 312, 321; 358/461, 521, 504, 518, 520, 406, 447, 464, 465

[56] References Cited

U.S. PATENT DOCUMENTS

| | | | |
|---|---|---|---|
| 4,097,847 | 6/1978 | Forsen et al. | 340/146.3 AE |
| 4,513,442 | 4/1985 | Scherl . | |
| 5,068,910 | 11/1991 | Ogura | 382/50 |
| 5,179,599 | 1/1993 | Formanek | 382/51 |
| 5,201,014 | 4/1993 | Degi et al. | 382/51 |
| 5,280,367 | 1/1994 | Zuniga | 358/462 |
| 5,282,061 | 1/1994 | Farrell | 358/464 |
| 5,287,204 | 2/1994 | Koizumi et al. | 358/538 |
| 5,289,296 | 2/1994 | Yamada | 358/530 |
| 5,371,615 | 12/1994 | Eschbach | 358/518 |
| 5,375,175 | 12/1994 | Kino et al. | 382/225 |
| 5,400,153 | 3/1995 | Schonenberg et al. | 358/516 |
| 5,420,938 | 5/1995 | Funada et al. | 382/173 |
| 5,550,931 | 8/1996 | Bellegarda et al. | 382/225 |
| 5,566,245 | 10/1996 | Zheng et al. | 382/112 |
| 5,581,370 | 12/1996 | Fuss et al. | 382/254 |
| 5,596,655 | 1/1997 | Lopez | 382/173 |
| 5,617,485 | 4/1997 | Ohuchi et al. | 382/176 |
| 5,703,959 | 12/1997 | Asano et al. | 382/225 |

FOREIGN PATENT DOCUMENTS

| | | | |
|---|---|---|---|
| 0 188 193 | 7/1986 | European Pat. Off. | H04N 1/40 |
| 0 371 389 | 6/1990 | European Pat. Off. | H04N 1/46 |
| 1 541 578 | 3/1979 | United Kingdom | H04N 1/40 |

*Primary Examiner*—Amelia Au
*Assistant Examiner*—Timothy M. Johnson

[57] ABSTRACT

A system for detecting image black and white points for a digital image. The system includes image partitioning routines for partitioning a digital image into image blocks, a pixel counter for determining whether the image block contains sufficient black and white pixels to classify the block as having relatively black text on a relatively white background, block validity testing routines for determining whether the selected image block is valid by determining whether the number of relatively black pixels for the selected image block is greater than a predetermined black threshold and whether the number of relatively white pixels for the selected image block is greater than a predetermined white threshold, and pixel clustering routines for arranging the relatively black pixels of a valid block into black clusters and the relatively white pixels of a valid block into white clusters and for assigning one of the black cluster centroids based on a first predetermined set of rules as the image black point and one of the white cluster centroids based on a second predetermined set of rules as the image white point.

18 Claims, 6 Drawing Sheets

//6,038,340//

SYSTEM AND METHOD FOR DETECTING THE BLACK AND WHITE POINTS OF A COLOR IMAGE

BACKGROUND OF THE INVENTION

1. Field of the Invention

This invention relates generally to black and white point detection routines, and more particularly to a system and method in a scanner for automatically detecting the black and white points of a color image.

2. Description of the Background Art

Optical scanners are widely used in image processing. These scanners capture analog pixel signals representing color images from media such as paper or photographs, convert the captured pixel signals to digital image signals, and typically forward the digital image signals to image processors.

The color of a first sheet of "white" paper may differ from that of a second sheet of "white" paper. Although both papers may be initially perceived as white, the papers nevertheless may prove to have different coloring when closely compared with one another. The light color of the paper is referred to as the "white point" of the document. Similarly, perceived "black" text on one medium may in actuality be different from perceived black text on another medium. The dark text color is referred to as the "black point" of the document. To accommodate different background and text colors of color images, modern scanners detect the image black and white points for re-scaling the scanners' profiles, detecting image black or white regions and maintaining image midtones.

For example, when a newspaper article is copied onto white paper, it may be preferred not to copy the newspaper "gray" background color onto the white paper. The modern scanner obtains the white point of the newspaper and of the white paper to eliminate the newspaper gray background color before printing the image on the white paper. By filtering out the background color before making the copy, unnecessary use of toner material may be avoided.

Further, when copying a yellowed original having only black and white information on a color reproduction system having a black toner reproduction unit and a color reproduction unit, the information is reproduced by the black toner unit while the background color must be reproduced by the color reproduction unit. This results in unnecessary and inefficient use of the color reproduction unit.

Therefore, an improved system and method are needed to automatically detect the black and white points of an image, particularly in a document having dark text on a light background.

SUMMARY OF THE INVENTION

The present invention provides a system and method for automatically detecting image black and white points for a digital image. The system includes image partitioning routines, a pixel counter, block validity testing routines and pixel clustering routines.

The image partitioning routines partition a digital image into image blocks, and a pixel counter counts the relatively black pixels and the relatively white pixels in a selected image block to determine whether the image block contains a sufficient number of black and white pixels to classify the block as having relatively black text on a relatively white background. The block validity testing routines determine whether the selected image block is valid by determining whether the number of relatively black pixels for the selected image block is greater than a predetermined black threshold and whether the number of relatively white pixels for the selected image block is greater than a predetermined white threshold. The pixel clustering routines arrange the relatively black pixels of a valid block into black clusters and the relatively white pixels of a valid block into white clusters, and assign a black cluster centroid as the image black point and a white cluster centroid as the image white point.

Upon identifying a member pixel of a cluster, the pixel clustering routines compute the new centroid of the cluster by applying the equations $$C_i^R = [(N*C_{i-1}^R) + R]/(N+1);$$

$$C_i^G = [(N*C_{i-1}^G) + G]/(N+1);$$

$$C_i^B = [(N*C_{i-1}^B) + B]/(N+1);$$

where $C_i^R$, $C_i^G$ and $C_i^B$ denote the new cluster centroid RGB values, $C_{i-1}^R$, $C_{i-1}^G$ and $C_{i-1}^B$ denote the previous cluster centroid RGB values exclusive of the selected pixel, N denotes the number of pixels in the cluster exclusive of the selected pixel, and R, G and B denote the RGB values for the selected pixel.

The invention also provides a method for detecting image black and white points for a digital image. The method includes the steps of partitioning the digital image into image blocks, determining whether the block is valid by determining whether the number of relatively black pixels in the block is greater than a predetermined black threshold and whether the number of relatively white pixels in the block is greater than a predetermined white threshold, arranging the relatively black pixels into black clusters and the relatively white pixels into white clusters for each valid block and assigning the centroid of one of the black clusters and the centroid of one of the white clusters as the black and white points, respectively.

DETAILED DESCRIPTION OF THE PREFERRED EMBODIMENT

Figure 1:
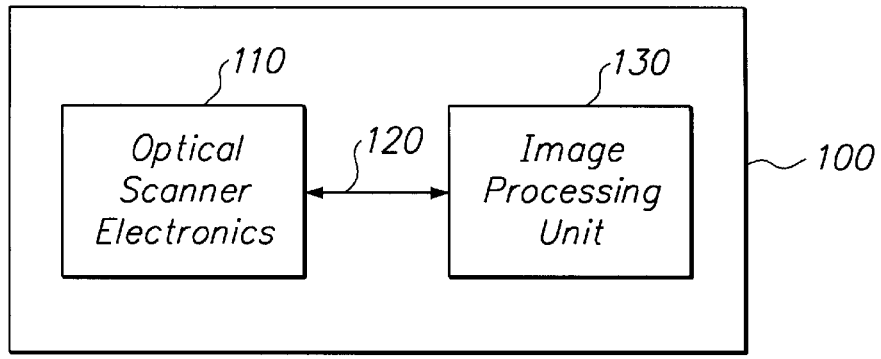
FIG. 1 is a block diagram illustrating components of a scanner in accordance with the present invention.

FIG. 1 is a block diagram illustrating components of a scanner 100 in accordance with the present invention. Scanner 100 includes optical scanner electronics 110 coupled via a signal bus 120 to a image processing unit 130. Optical scanner electronics 110 includes conventional light-sensing equipment for capturing pixel signals representing an image embodied on a medium such as paper. Optical scanner electronics 110 converts the captured pixel signals to digital image signals ("digital images"), and forwards the digital image via signal bus 120 to image processing unit 130. Optical scanner electronics 110 may be based on a "flatbed" scanner which moves a scanning mechanism across a stationary document, as in the common office copier, or based on a "rotation" scanner which moves a sheet of paper across a stationary scanning mechanism, as in common fax machines.

Upon receipt of the digital image signal, image processing unit 130, which can be implemented in software or firmware, applies a pixel clustering algorithm to determine the baseline black and white points of the image. Image processing unit 130 may use the detected black and white points conventionally to re-scale the scanner 100 profile to detect image black or white regions, maintain image midtones and perform other conventional functions.

Figure 2:
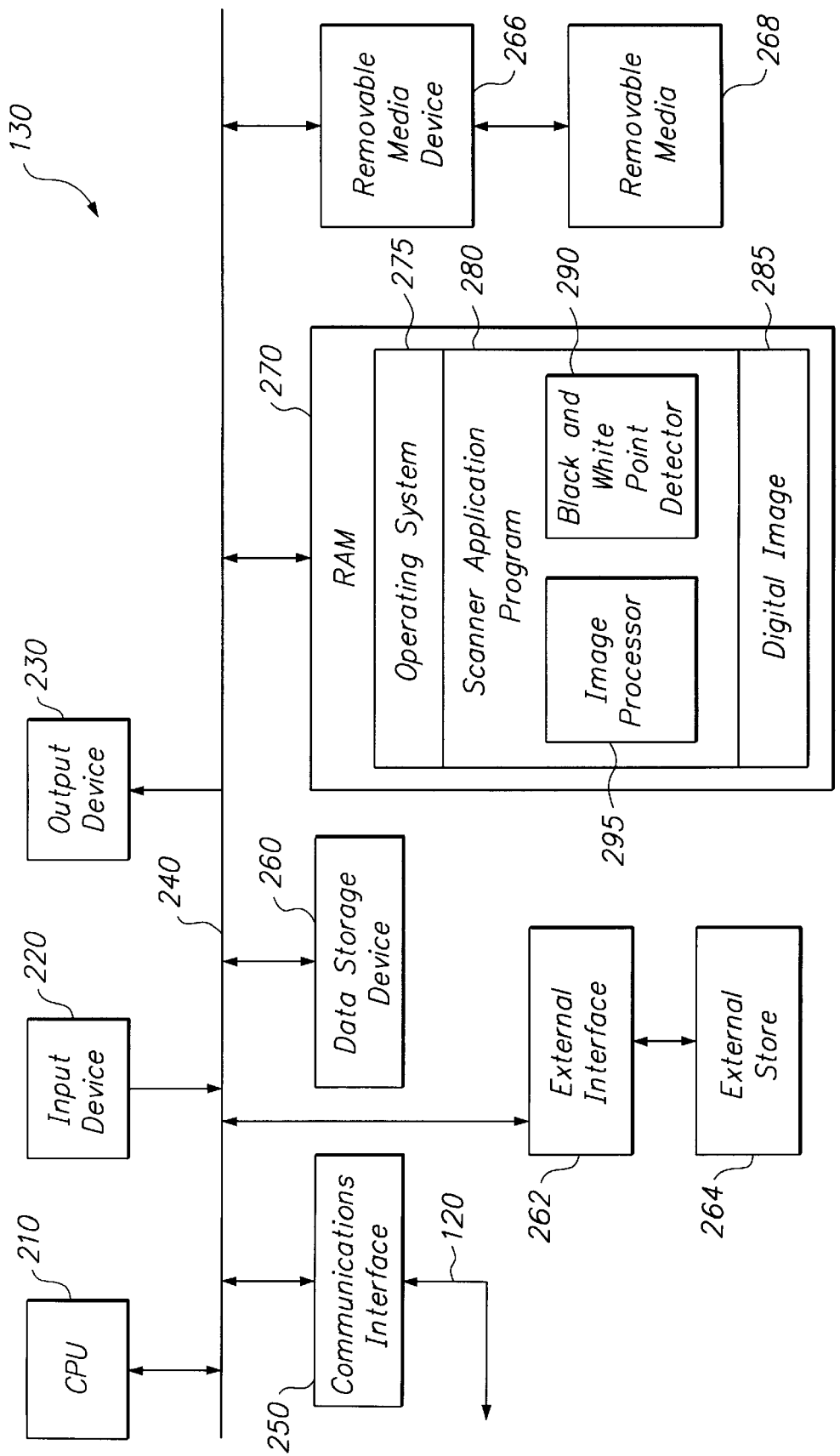
FIG. 2 is a block diagram illustrating components of the FIG. 1 image processing unit.

FIG. 2 is a block diagram illustrating image processing unit 130 components, which include a Central Processing Unit (CPU) 210 such as a Motorola Power PC® microprocessor or an Intel Pentium® microprocessor. Image processing unit 130 components also include an input device 220 such as a keyboard and a mouse, an output device 230 such as a Cathode Ray Tube (CRT) display, a data storage device 260 such as a magnetic disk, ROM, RAM, EPROM, EEPROM or Flash EEPROM, and a Random Access Memory (RAM) 270. Each of these components is coupled via a second signal bus 240 to CPU 210.

Image processing unit 130 components further include a communications interface 250 coupled between first signal bus 120 and second signal bus 240 for transferring signals therebetween. For example, communications interface 250 receives a digital image 285 from optical scanner electronics 110 (FIG. 1) and forwards the digital image 285 to data storage device 260 for storage or to RAM 270 for image processing.

Image processing unit 130 components may further include an external interface 262, such as an Ethernet® port, coupled between second signal bus 240 and an external store 264. External store 264 may include another system 130, a computer-readable storage component, a network of computers or storage components, or a similar device in communication with system 130 and capable of exchanging information therewith.

Image processing unit 130 components may further include a removable media device 266 coupled between second signal bus 240 and a removable media 268. Removable media device 266 may include a system-addressable storage device, such as a floppy disk drive or CD-ROM drive, which is capable of accepting, reading and writing information to removable media 268. Removable media 268 may include a floppy disk, CD-ROM or other apparatus suitable for holding information in a computer-readable form.

Operating system 275 is a program for controlling processing by CPU 210, and is typically stored in data storage device 260, external store 264 or removable media 268 and loaded into RAM 270 for execution. Scanner application program 280 includes a black and white point detector program 290 for detecting baseline black and white points from digital image 285 and includes an image processor program 295 for using the baseline black and white points to process digital image 285. Scanner application program 280 may also be stored in data storage device 260, external store 264 or removable media 268 and loaded into RAM 270 for execution.

Figure 3:
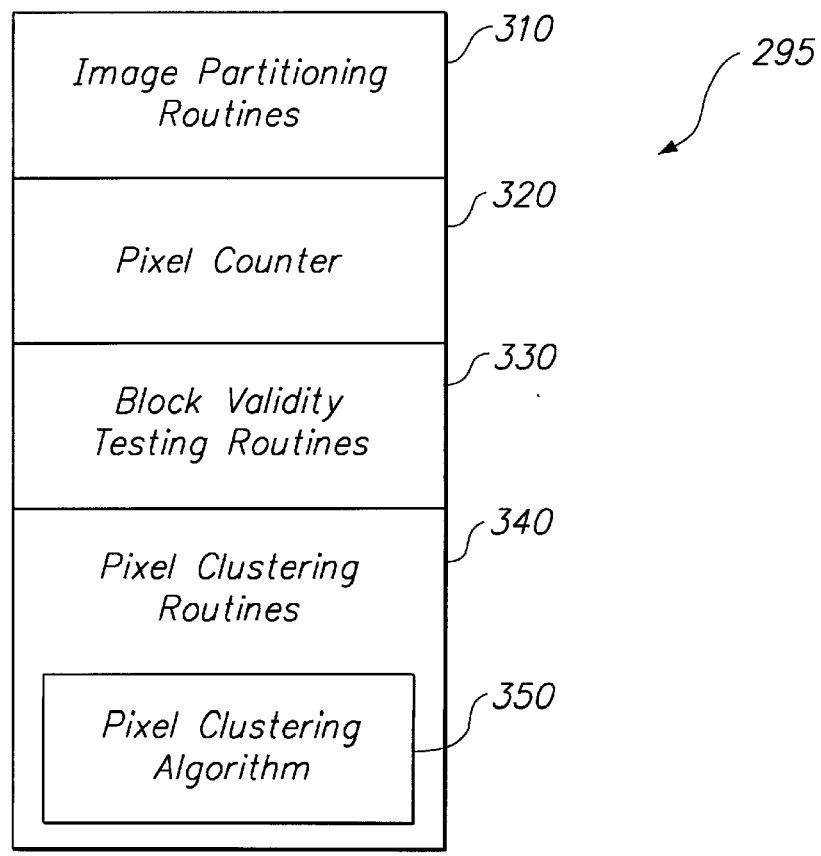
FIG. 3 is a block diagram detailing the FIG. 2 black/white point detector.

FIG. 3 is a block diagram illustrating details of black and white point detector program 290, which include image partitioning routines 310, a pixel counter 320, block validity testing routines 330 and pixel clustering routines 340 having a pixel clustering algorithm 350.

Image partitioning routines 310 divide digital image 285, which has N pixels by M lines, into a series of local image blocks. Image partitioning routines 310 may divide digital image 285 into for example thirty-two pixel by thirty-two line local image blocks, although the block dimensions need not be equal.

Pixel counter 320 selects an unprocessed local image block and uses a technique referred to as "thresholding" to compute the number of black pixels and the number of white pixels in the selected block. Pixel counter 320 counts a pixel having each of its Red, Green and Blue (RGB) component values less than a black pixel threshold $T_U$ (i.e., $R<T_U$, $G<T_U$ and $B<T_U$) as a relatively black pixel, and counts a pixel having each of its RGB component values greater than a white pixel threshold $T_L$ (i.e., $R>T_L$, $G>T_L$ and $B>T_L$) as a relatively white pixel. Pixels that do not satisfy either of the criteria are assumed to be color pixels and are ignored. The total number of relatively black pixels in a block is the "black count" $C_B$ and the total number of relatively white pixels in a block is the "white count" $C_W$.

Black pixel threshold $T_U$ and white pixel threshold $T_L$ depend upon the particular hardware being used, which may differ for different scanners. However, for illustrative purposes only, using RGB values within the range [0:255], black pixel threshold $T_U$ may be for example 80 and white pixel threshold $T_L$ may be for example 180.

Block validity testing routines 330 examine the black and white counts $C_B$ and $C_W$ to determine whether the block being processed contains sufficient numbers of black pixels and of white pixels to classify the block as having dark text on a light background. More particularly, block validity testing routines 330 determine whether black count $C_B$ is greater than a black count threshold $T_B$ and whether white count $C_W$ is greater than a white count threshold $T_W$. If both tests are passed, then block validity testing routines 330 deem the block "valid."

Because in text there are more background pixels than character pixels, the white count threshold $T_W$ is preferably twice the black count threshold $T_B$. For a thirty-two-pixel-by-thirty-two-line image block, which contains 1024 pixels, black count threshold $T_B$ may be for example 85 and white count threshold $T_W$ may be for example 170. Thus, to determine that a block is valid, block validity testing routines 330 need to count at least 85 black pixels and at least 170 white pixels. Parameters $T_B$ abd $T_W$ are determined based on the scan resolution.

Pixel clustering routines 340 use a clustering technique to locate black pixel and white pixel groupings, separately. A pixel clustering algorithm 350 is described in detail below with reference to FIGS. 4 and 5. Pixel clustering routines 340 then assign the centroid of the cluster having the most relatively black pixels as the black point, and the centroid of the cluster having the most relatively white pixels as the white point. Centroid selection is described in greater detail below with reference to FIGS. 6 and 7.

Figure 4:
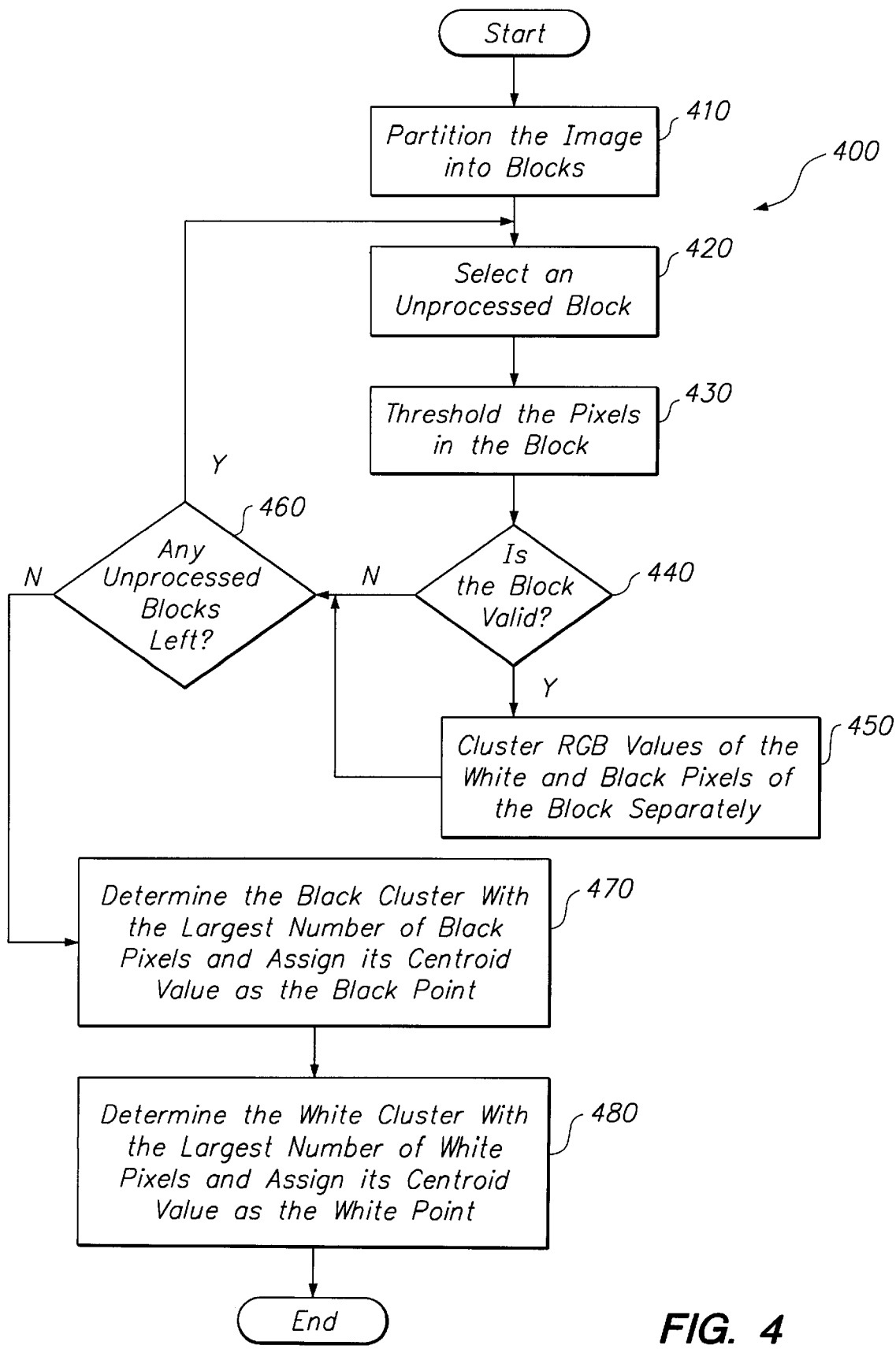
FIG. 4 is a flowchart illustrating a method for detecting the black and white points of a digital image.

FIG. 4 is a flowchart illustrating a method 400 for computing the black and white points for digital image 285.

Method 400 begins in step 410 with image partitioning routines 310 partitioning digital image 285 into a series of image blocks, each block having dimensions of for example thirty-two pixels by thirty-two lines. In step 420 pixel counter 320 selects an unprocessed image block, and in step 430 compares the RGB values for each pixel in the selected block against the black and white thresholds ($T_U$ and $T_L$) to determine the number of relatively black pixels and the number of relatively white pixels ($C_B$ and $C_W$) in the block.

In step 440 block validity testing routines 330 determine whether the numbers of black and white pixels in the selected block meet the minimum thresholds ($T_B$ and $T_W$), thereby determining whether the block is valid (i.e., includes dark text on a light background). If the block is invalid, then pixel counter 320 continues with step 460 as described below. Otherwise, if the block is valid, then in step 450 pixel clustering routines 340 use pixel clustering algorithm 350 to cluster the black and white pixels separately for the selected and validated block. Pixel clustering algorithm 350 is described in detail below with reference to FIG. 5. Pixel clustering routines 340 then continue to step 560.

In step 460, pixel counter 320 tests whether any unprocessed image blocks remain. If so, then pixel counter 320 returns to step 420 to select another unprocessed block. If no blocks remain, then pixel clustering routines 340 in step 470 assign the centroid of the cluster having the most black pixels as the black point, and in step 480 assigns the centroid of the cluster having the most white pixels as the white point. Steps 470 and 480 are detailed with reference to FIGS. 6 and 7. Method 400 then ends.

Figure 5:
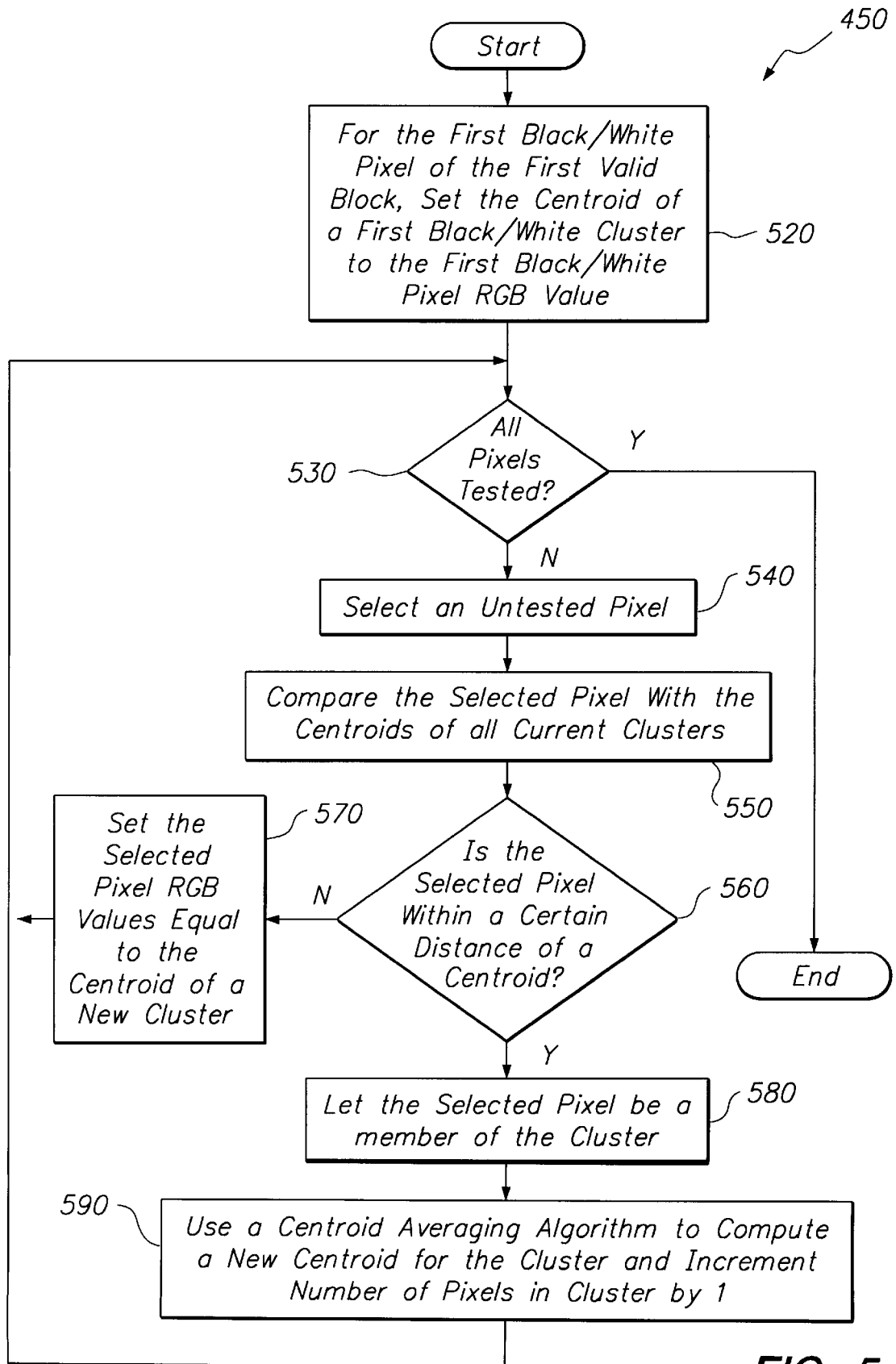
FIG. 5 is a flowchart illustrating the step of clustering valid local image block pixels in the FIG. 4 method.

FIG. 5 is a flowchart of steps in the FIG. 4 operation 450 of using pixel clustering algorithm 350. This algorithm is implemented on black and white pixels separately. Method 450 begins in step 520 with pixel clustering routines 340 setting the centroid of a first black/white cluster to the RGB values of a first black/white pixel of the first detected valid block.

Pixel clustering routines 340 in step 530 test whether all the pixels have been tested. If so, then method 450 ends. If not, then in step 540 pixel clustering routines 340 select an untested pixel and in step 550 compares the selected pixel's RGB values with the centroids' RGB values of the "current" (i.e., as currently established) clusters. Pixel clustering routines 340 in step 560 determine whether the selected pixel resides within a predetermined "distance" (dR, dG, dB) of a cluster centroid to determine whether it belongs to that cluster. Step 560 may be implemented using absolute values, Euclidean distances, etc. If the pixel does not belong to any of the clusters, then in step 570 pixel clustering routines 340 set the RGB values of the selected pixel to be the centroid of a new cluster, and return to step 530.

If the selected pixel is within the predetermined distance of a cluster centroid, then in step 580 pixel clustering routines 340 assign the selected pixel to be a member of the cluster, increments by one the number of pixels in that cluster, and computes the new cluster centroid. Pixel clustering routines 340 in step 590 preferably apply the following centroid averaging equations:

$$C_i^R = [(N * C_{i-1}^R) + R]/(N+1)$$

$$C_i^G = [(N * C_{i-1}^G) + G]/(N+1)$$

$$C_i^B = [(N * C_{i-1}^B) + B]/(N+1)$$

where $C_i^R$, $C_i^G$ and $C_i^B$ denote the new cluster centroid RGB values inclusive of the selected pixel; $C_{i-1}^R$, $C_{i-1}^G$ and $C_{i-1}^B$ denote the previous cluster centroid RGB values exclusive of the selected pixel; N denotes the number of pixels in the cluster exclusive of the selected pixel; and R, G and B denote the RGB values for the selected pixel. After computing the new centroid for the cluster based on the new member pixel RGB values, pixel clustering routines 340 return to step 530.

Figure 6:
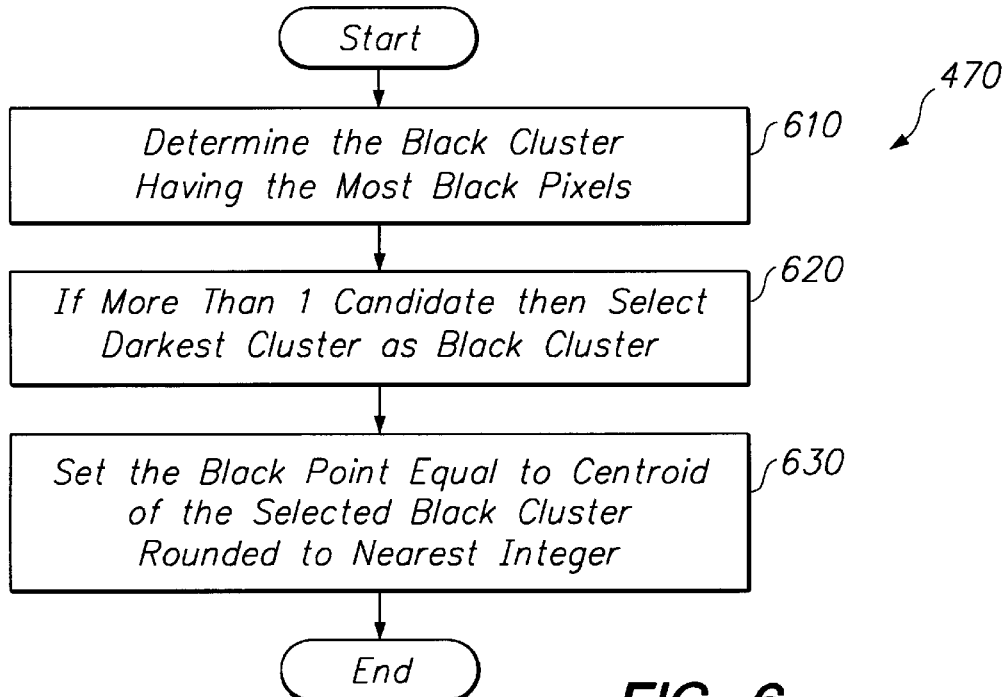
FIG. 6 is a flowchart illustrating the step of computing the black point of a digital image from the FIG. 5 clusters in the FIG. 4 method.

FIG. 6 is a flowchart illustrating steps in the FIG. 4 operation 470, which begins in step 610 with pixel clustering routines 340 determining the black cluster having the most black pixels. Pixel clustering routines 340 preferably disregard as noise all black clusters having less than a predetermined minimum pixel count, such as 20,000 pixels. The minimum pixel count varies depending on the scan resolution. If multiple clusters are identified, then in step 620 pixel clustering routines 340 compare the clusters' centroid RGB values to select the darkest of the clusters as the black cluster. Pixel clustering routines 340 in step 630 round the centroid RGB values of the selected black cluster to the nearest integer, and assign this centroid value of the black cluster to be the black point. Method 470 then ends.

Figure 7:
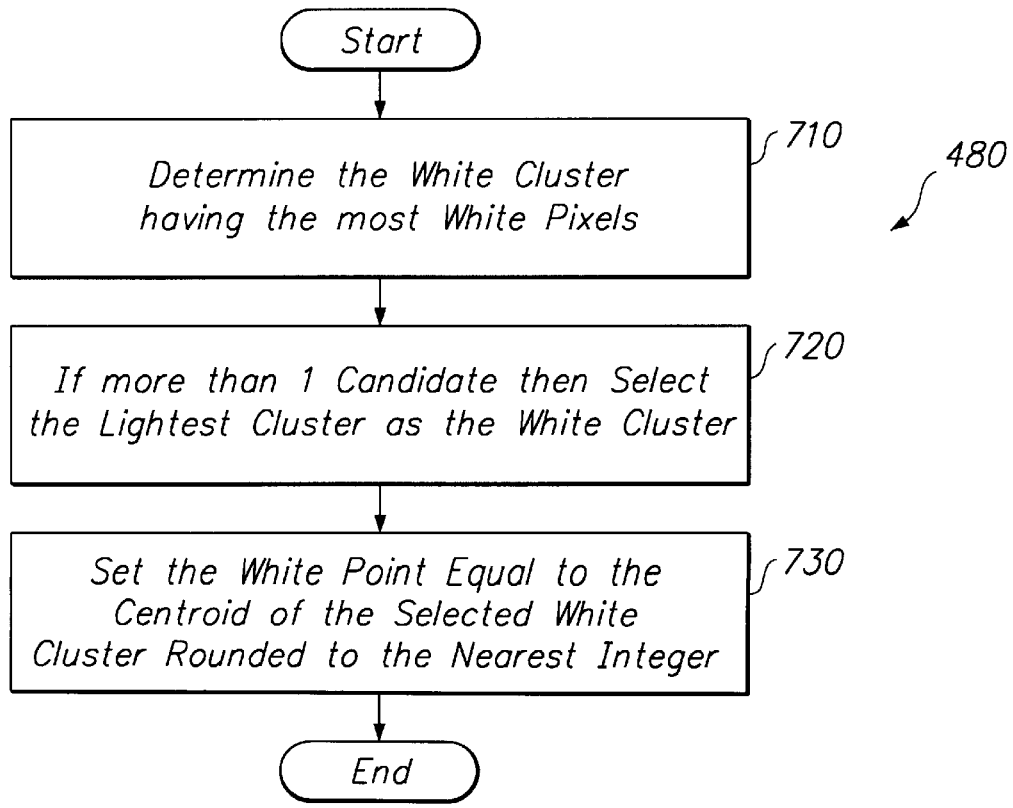
FIG. 7 is a flowchart illustrating the step of computing the white point of a digital image from the FIG. 5 clusters in the FIG. 4 method.

FIG. 7 is a flowchart illustrating steps in the FIG. 4 operation 480, which begins in step 710 with pixel clustering routines 340 determining the white cluster having the most white pixels. Pixel clustering routines 340 preferably disregard as noise all white clusters having less than a predetermined minimum pixel count, such as 50,000 pixels. This minimum pixel count also varies depending on the scan resolution. If multiple clusters are identified, then in step 720 pixel clustering routines 340 compare the clusters' centroid RGB values to select the lightest of the clusters as the white cluster. Pixel clustering routines 340 in step 730 round the centroid RGB values of the selected white cluster to the nearest integer, and assign this centroid value of the white cluster to be the white point. Method 480 then ends.

Where the total number of black/white pixels in all valid blocks is denoted by K, the number of clusters is denoted by M (initially 0), the RGB values for the $k^{th}$ pixel are denoted by ($R_k$, $G_k$, $B_k$), the predetermined maximum RGB distance for a pixel to be a member of a particular cluster is denoted by $d_R$, $d_G$ and $d_B$, the centroid of the $m^{th}$ cluster is denoted by ($C_m^R$, $C_m^G$, $C_m^B$) and the number of pixels in the $m^{th}$ cluster is denoted by $N_m$, the pixel clustering algorithms may be written in "pseudo-code" as follows:

```
C_0^R = R_0; C_0^G = G_0; C_0^B = B_0;      ***first centroid is set to
                                              first black/white pixel***
M = 1;                                      ***set number of current
                                              black/white clusters***
for (k = 1; k < K; k++){                    *for each black/white pixel*
    part-of-an-old-cluster = No;
    for (m = 0; m < M; m++) {               *for each black/white cluster*
      if |R_k - C_m^R| < d_R and             ***are pixel RGB values
         |G_k - C_m^G| < d_G and               within predetermined
         |B_k - C_m^B| < d_B {                 distance of a cluster centroid***
       then
         C_m^R = [(N_m*C_m^R) + R_k]/        *compute new centroids*
           (N_m + 1);
         C_m^G = [(N_m*C_m^G) + G_k]/
           (N_m + 1);
         C_m^B = [(N_m*C_m^B) + B_k]/
           (N_m + 1);
         N_m = N_m + 1;
           part-of-an-old-cluster =
           Yes;
    }                                       *end if*
    }                                       *end for m*
    if (part-of-an-old-cluster = No) {      *new cluster*
    then
```

```
    C_M^R = R_k; C_M^G = G_k; C_M^B =     ***new cluster's centroid set
    B_k;
        N_M = 1; M++;                    to pixel RGB values***
    }                                    *end if*
}                                        *end for k*
max = min-number-of-pixels;              ***minimum number of pixels for
                                         a cluster to be valid***
for (m = 0; m < M; m++) {                *for each black/white cluster*
    if (N_m > max) {                     *no noise*
    then
        P_R = (C_m^R + .5);              *** black/white point equals
        P_G = (C_m^G + .5);              centroid of black/white cluster
        P_B = (C_m^B + .5);              having most member pixels
        max = N_m;                       rounded off to nearest integer***
    }
}
```

Figure 8:
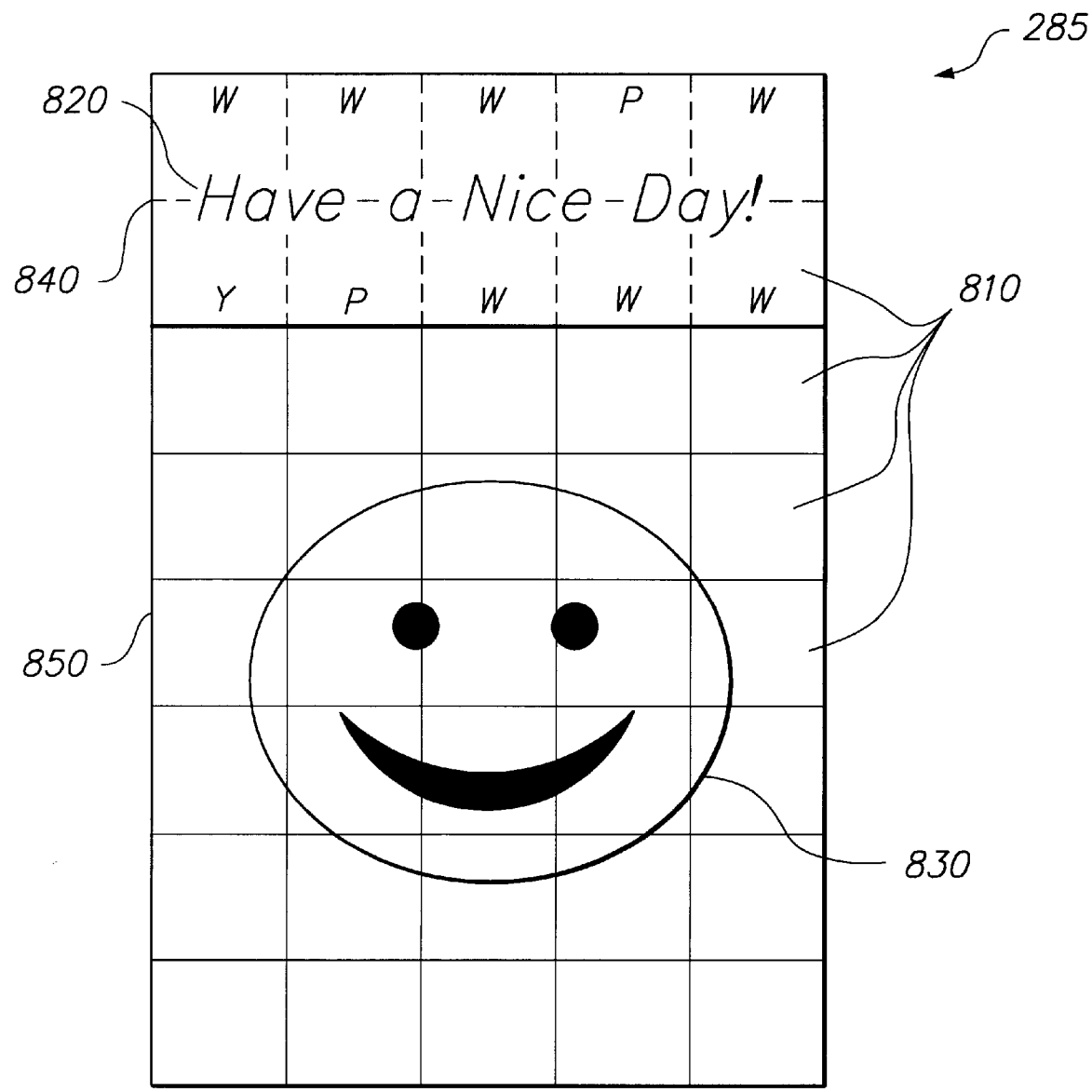
FIG. 8 is a graphical representation illustrating the method of FIG. 4 for determining the black and white points of an example digital image.

FIG. 8 is a graphical representation illustrating method 400 for determining the black and white points of an example digital image 285. Digital image 285 is illustrated as text ("Have a Nice Day!") 820 written above a picture (colored smiling face) 830. Image partitioning routines 310 partition digital image 285 into a series of image blocks 810, with the text 820 being embodied in blocks 840 and the picture 830 being embodied in blocks 850. Pixel counter 320 selects an unprocessed image block 810, and compares the RGB values for each pixel in the selected block 810 against the black and white thresholds ($T_U$ and $T_L$) to determine the number of relatively lack pixels and the number of relatively white pixels ($C_B$ and $C_W$) in he block 810.

Block validity testing routines 330 determine whether the numbers of black and white pixels in the selected block 810 meet the minimum thresholds ($T_B$ and $T_W$), thereby determining whether the block 810 is valid (i.e., includes dark text on a light background). Accordingly, block validity testing routines 330 determine that blocks 840 are valid blocks and blocks 850 are invalid blocks. Pixel clustering routines 340 clusters the black and white pixels separately for only valid blocks 840, thereby avoiding unnecessary computational cost in examining the invalid blocks 850.

Pixel clustering routines 340 set the centroid of a first black/white cluster to the RGB values of a first black/white pixel of the first detected valid block 840. Pixel clustering routines 340 select the pixels of the valid blocks 840 successively and compare the pixels' RGB values with the centroids of the "current" (i.e., as currently established) clusters. For determining the white point, pixel clustering routines 340 group the white pixels in blocks 840 into various white clusters. For example, pixel clustering routines 340 groups the pixels which are colored W (white) in a first cluster, the pixels which are colored P (pinkish) in a second cluster and the pixels which are colored Y (yellowish) in a third cluster. As each pixel of each valid block 840 is examined, pixel clustering routines 340 compute the centroids of these clusters as described above with reference to FIGS. 4–7.

When the RGB values for the pixels of all the valid blocks have been examined and clustered, the centroid of the cluster having a greatest number of member pixels is assigned as the white point. Based on this example digital image 285, the white point RGB values are determined from the centroid of the W cluster, i.e., the cluster having the most member pixels. The black point is detected in a similar manner.

The foregoing description of the preferred embodiments of the invention is by way of example only, and other variations of the above-described embodiments and methods are provided by the present invention. Components of this invention may be stored on magnetic or other computer-readable media and implemented using a programmed general purpose digital computer. This invention may further be implemented using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A computer-implemented method for obtaining a black point and a white point for a digital image, comprising the steps of:

partitioning the digital image into image blocks;

classifying each of the image blocks as valid if a given image block has a total number of relatively black pixels exceeding a first predetermined threshold and a total number of relatively white pixels exceeding a second predetermined threshold, wherein a relatively black pixel is defined as a pixel whose color component values are each less than a predetermined black pixel threshold and a relatively white pixel is defined as a pixel whose color component values are each greater than a predetermined white pixel threshold;

clustering the relatively black pixels of the valid image blocks into at least one black cluster and the relatively white pixels of the valid image blocks into at least one white cluster, each black cluster having a black cluster centroid and each white cluster having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid; and selecting one of the black cluster centroids according to a first predetermined set of rules to be a black point of the digital image and one of the white cluster centroids according to a second predetermined set of rules to be a white point of the digital image.

2. The method of claim 1, wherein the step of partitioning includes partitioning the digital image into equal-sized image blocks.

3. The method of claim 1, wherein a relatively black pixel is defined as a pixel whose RGB values are each less than the predetermined black pixel threshold and a relatively white pixel is defined as a pixel whose RGB values are each greater than the predetermined white pixel threshold.

4. The method of claim 1, wherein the step of clustering includes applying a centroid averaging algorithm.

5. The method of claim 4, wherein the step of clustering includes establishing new cluster centroid RGB values based on adding a selected pixel by applying the equations $C_i^R = [(N*C_{i-1}^R)+R]/(N+1);$ $C_i^G = [(N*C_{i-1}^G)+G]/(N+1);$ $C_i^B = [(N*C_{i-1}^B)+B]/(N+1);$ where $C_i^R$, $C_i^G$ and $C_i^B$ denote the new cluster centroid RGB values; $C_{i-1}^R$, $C_{i-1}^G$ and $C_{i-1}^B$ denote the previous cluster centroid RGB values exclusive of the selected pixel; N denotes the number of pixels in the cluster exclusive of the selected pixel; and R, G and B denote the RGB values for the selected pixel.

6. The method of claim 1, wherein the step of selecting includes selecting the black cluster centroid of the black cluster having a greatest number of pixels as the black point and selecting the white cluster centroid of the white cluster having a greatest number of pixels as the white point.

7. A computer-based method of detecting an image black point and an image white point for a digital image, comprising the steps of:

partitioning the digital image into image blocks;

determining whether each of the image blocks is valid, by determining whether a total number of relatively black pixels in a given image block is greater than a first predetermined threshold and whether a total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold;

arranging the relatively black pixels of the valid image blocks into black clusters and the relatively white pixels of the valid image blocks into white clusters, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid; and selecting one of the black cluster centroids based on a first predetermined set of rules as the black point and one of the white cluster centroids based on a second predetermined set of rules as the white point of the digital image.

8. The method of claim 7, wherein the step of partitioning includes partitioning the digital image into equal-sized image blocks.

9. The method of claim 7, wherein a relatively black pixel is defined as a pixel whose RGB values are each less than the predetermined black pixel threshold and a relatively white pixel is defined as a pixel whose RGB values are each greater than the predetermined white pixel threshold.

10. The method of claim 7, wherein the step of arranging includes applying a centroid averaging algorithm.

11. The method of claim 10, wherein the step of arranging includes establishing new cluster centroid RGB values based on adding a selected pixel by applying the equations $C_i^R = [(N*C_{i-1}^R)+R]/(N+1);$ $C_i^G = [(N*C_{i-1}^G)+G]/(N+1);$ $C_i^B = [(N*C_{i-1}^B)+B]/(N+1);$ where $C_i^R$, $C_i^G$ and $C_i^B$ denote the new cluster centroid RGB values; $C_{i-1}^R$, $C_{i-1}^G$ and $C_{i-1}^B$ denote the previous cluster centroid RGB values exclusive of the selected pixel; N denotes the number of pixels in the cluster exclusive of the selected pixel; and R, G and B denote the RGB values for the selected pixel.

12. The method of claim 7, wherein the step of selecting includes selecting the centroid of the black cluster having a greatest number of pixels as the black point and selecting the centroid of the white cluster having a greatest number of pixels as the white point.

13. A system for detecting respective black and white points for a digital image, comprising:

means for partitioning the digital image into image blocks;

means for determining whether each of the image blocks is valid, by determining whether a total number of relatively black pixels in a given image block is greater than a first predetermined threshold and whether a total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold; and means for arranging the relatively black pixels of the valid image blocks into black clusters and the relatively white pixels of the valid image blocks into white clusters, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid, and for selecting one of the black cluster centroids based on a first predetermined set of rules as the black point and one of the white cluster centroids based on a second predetermined set of rules as the white point of the digital image.

14. A computer-readable storage medium storing program code for causing a computer to perform the steps of:

partitioning the digital image into image blocks;

determining whether each of the image blocks is valid, by determining whether a total number of relatively black pixels in a given image block is greater than a first predetermined threshold and whether a total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold;

arranging the relatively black pixels of the valid image blocks into black clusters and the relatively white pixels of the valid image blocks into white clusters for each valid image block, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid; and selecting one of the black cluster centroids based on a first predetermined set of rules as the black point and one of the white cluster centroids based on a second predetermined set of rules as the white point of the digital image.

15. A system for detecting an image black point and an image white point for a digital image, comprising:

a memory storing a digital image and image threshold data;

an image partitioning element coupled to the memory for partitioning the digital image into image blocks;

a pixel counter coupled to the image partitioning element for counting relatively black pixels based on the threshold data and relatively white pixels based on the threshold data in each of the image blocks, and accumulating a total number of relatively black pixels for each of the image blocks and a total number of relatively white pixels for each of the image blocks;

a block validity testing element coupled to the pixel counter for determining whether each of the image blocks is valid by determining whether the total number of relatively black pixels in a given image block is greater than a first predetermined threshold and the total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold; and a pixel clustering element coupled to the block validity testing element for arranging the relatively black pixels of the valid blocks into black clusters and the relatively white pixels of the valid blocks into white clusters, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid, and for selecting one of the black cluster centroids based on a first predetermined set of rules as the image black point and one of the white cluster centroids based on a second predetermined set of rules as the image white point.

16. The system of claim 15, wherein the pixel clustering element uses a centroid averaging algorithm to arrange the black and white pixels into black and white clusters, respectively.

17. A scanner for scanning an image from a medium, comprising:

optical scanner electronics for capturing optical information of the image from the medium and converting the optical information to a digital image; and an image processing unit coupled to the optical scanner electronics and including memory, said image processing unit comprising a black and white point detector having image partitioning routines for partitioning the digital image into image blocks;

a pixel counter for counting relatively black pixels and relatively white pixels in each of the image blocks;

block validity testing routines for determining whether each image block is valid by determining whether a total number of relatively black pixels in a given image block is greater than a first predetermined threshold and a total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold; and pixel clustering routines for arranging the relatively black pixels of the valid image blocks into black clusters and the relatively white pixels of the valid image blocks into white clusters, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid, and for selecting one of the black cluster centroids based on first predetermined set of rules as the image black point and one of the white cluster centroids based on a second predetermined set of rules as the image white point.

18. An article of manufacture, comprising a computer usable medium having readable code means embodied therein for detecting an image black point and an image white point for a digital image, the computer readable code program means comprising computer readable program code means for partitioning the digital image into image blocks;

computer readable program code means for determining whether each of the image blocks is valid, by determining whether a total number of relatively black pixels in a given image block is greater than a first predetermined threshold and whether a total number of relatively white pixels in the given image block is greater than a second predetermined threshold, wherein a relatively black pixel is defined as a pixel whose color component values are each less than a predetermined black pixel threshold and a relatively white pixel is defined as a pixel whose color component values are each greater than a predetermined white pixel threshold; and computer readable program code means for arranging the relatively black pixels of the valid image blocks into black clusters and the relatively white pixels of the valid image blocks into white clusters, each of the black clusters having a black cluster centroid and each of the white clusters having a white cluster centroid, wherein a current centroid of a first black cluster is set to color component values of a first relatively black pixel, a current centroid of a first white cluster is set to color component values of a first relatively white pixel, and color component values of a selected untested pixel are compared with the color component values of each of the current centroids of the first black and white clusters to determine if the selected pixel belongs to the first black cluster, the first white cluster or a new cluster, wherein as a new pixel is added to an existing cluster new centroid color component values are calculated for the existing cluster based on the existing cluster's current centroid color component values and color component values of the new pixel, there being at least three color component values for each pixel and each centroid, and for selecting one of the black cluster centroids based on a first predetermined set of rules as the black point and one of the white cluster centroids based on a second predetermined set of rules as the white point of the digital image.

* * * * *